E. I. DODDS.
RESILIENT BOLT.
APPLICATION FILED JULY 3, 1913.
1,228,189.
Patented May 29, 1917.
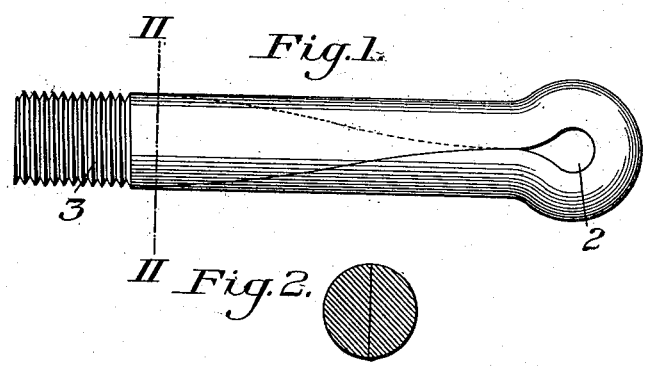
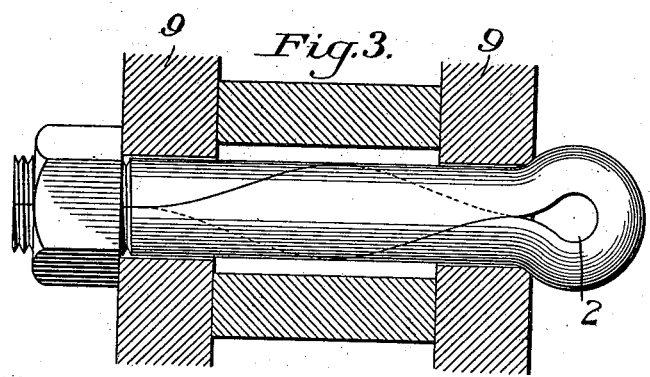
WITNESSES
INVENTOR

UNITED STATES PATENT OFFICE.

ETHAN I. DODDS, OF CENTRAL VALLEY, NEW YORK, ASSIGNOR TO KERNER MANUFACTURING COMPANY, OF PITTSBURGH, PENNSYLVANIA, A CORPORATION OF PENNSYLVANIA.

RESILIENT BOLT.

1,228,189.  Specification of Letters Patent.  Patented May 29, 1917.

Application filed July 3, 1913. Serial No. 777,211.

*To all whom it may concern:*

Be it known that I, ETHAN I. DODDS, a citizen of the United States, and a resident of Central Valley, in the county of Orange and State of New York, have invented a new and useful Improvement in Resilient Bolts, of which the following is a full, clear, and exact description, reference being had to the accompanying drawings, in which—

Figure 1 is a side elevation of my improved bolt.

Fig. 2 is a sectional view on the line II—II of Fig. 1.

Fig. 3 is a side elevation of a bolt and nut placed in position for holding several members together.

My invention relates to the class of bolts wherein longitudinal elasticity or resiliency is desired. It is principally used in railway track structures, but may be used in other locations where elasticity is desired.

The precise nature of my invention will be best understood by reference to the accompanying drawings which will now be described, it being premised, however, that various changes may be made in the precise form of the bolt, the method of making the bolt and the twist in the bolt, without departing from the spirit and scope of my invention as defined in the appended claims.

In carrying out my invention in its preferred form, I take a bar of steel of semicircular cross section, preferably rolled, and bend the bar upon itself at its central portion to form an eye, such as indicated at 2 in Fig. 1. The flat surfaces of the two members of the bar are brought together so as to engage each other throughout the length of the bolt from the eye, and the bolt is then twisted and threaded at its outer end, as indicated at 3. A bolt such as shown in Fig. 1 but which has been twisted to a greater degree is shown in Fig. 3. After the bolt has been secured to its position, any lateral strain on the members 9, 9 will tend to compress the members forming the head toward each other and permit a slight spreading of the members 9, 9, such as is caused on the fish plates of a rail joint, and as soon as the pressure has been removed, the bolt will assume its original position. The twisting of the bolt at an angle will also permit the body of the bolt to be extended under such stresses.

The advantages of my invention result from the provision of a bolt having a portion or portions which are adapted to yield to permit elongation of the bolt. Further, from the provision of a bolt having a plurality of members twisted about each other at an angle of less than 180 degrees to permit a further elongation of the bolt.

I claim:

1. A bolt having a head in the form of an eye, and separate members extending from the head to the other end of the bolt and having screw threads on the ends thereof, said members being twisted about each other at an angle of less than 180°; substantially as described.

2. A bolt having a head in the form of an eye and a plurality of separate members extending therefrom, the ends of said members being provided with a screw thread, said members being twisted about each other; substantially as described.

In testimony whereof, I have hereunto set my hand.

ETHAN I. DODDS.

Witnesses:
 GEO. B. BLEMING,
 LEO A. GUEHL.

Copies of this patent may be obtained for five cents each, by addressing the "Commissioner of Patents, Washington, D. C."